United States Patent Office 3,689,287
Patented Sept. 5, 1972

3,689,287
PROCESS FOR MAKING PEANUT FLAKES
Jack H. Mitchell, Jr., 101 Bradley St.,
Clemson, S.C. 29631
No Drawing. Filed July 7, 1969, Ser. No. 839,673
Int. Cl. A23l 1/36
U.S. Cl. 99—126                                 6 Claims

ABSTRACT OF THE DISCLOSURE

A process of converting peanuts into precooked flakes, high in protein and calories, which includes the steps of removing the skins and hearts from the uncooked and unroasted peanuts, reducing the moisture content, grinding the peanuts to a fine consistency, heating the finely divided peanuts with water, and then drum drying the product.

---

The process of the present invention converts peanuts into precooked flakes of bland taste. The process utilizes the entire shelled peanut with the exception of the hearts and skins. The oil need not be removed, contributing to the economical conversion to a food product rich in protein and high in calories. The present process and product will probably enable the grower of peanuts to realize a higher income from his crop than at present wherein peanuts are utilized chiefly as salted peanuts, peanut butter, in confections, and for oil. The residue from extraction of oil is generally used for cattle feed. The product of the invention should prove particularly useful in areas which lack sufficient animal protein supplies.

Although the flakes may contain as much as 46 to 54 percent fat, they do *not* present an oily appearance unless they are ground to a fine state. If this is done, free oil is released and the product assumes the characteristics of a paste. If materials such as low-fat peanut flour, precooked potatoes, rice, or other substances of low fat content are incorporated with the cooked finely ground peanut-water mixture just prior to drum drying, the resultant flakes have a reduced fat content, depending upon the relative quantities of each component. Such flakes may be reduced to a flour instead of a paste by grinding.

In accordance with the invention, the skins are first removed from the shelled peanuts as well as the hearts, the latter being a source of bitter flavor. Commercial methods of accomplishing this are well known. For example, the peanuts may be water blanched or heated to about 225° F. for one hour in an oven to loosen the red skins prior to mechanical removal. While heat is used in this step of the process, it may more properly be considered as a dehydration step, mainly for the purpose of redrying the moisture content of the peanuts in order that a satisfactory fine grind, which follows the dehydration, can be obtained.

Essentially, the first step in the present improved process consists in preheating the finely ground, low moisture content peanuts, with water, prior to drum drying. This preheating brings about a number of desirable changes relative to flavour in that it releases compounds having a somewhat unpleasant aroma. These compounds are removed during subsequent drum drying since they are volatile with the steam issuing from the thin layer of material coating the surfaces of the drums. This results in a flaked product of bland taste, free from raw or other objectionable flavor. The preheating also contributes to stability of the finished product during storage and produces a desired texture of the flake. It further develops an optimum consistency for drum drying.

The material after drum drying may be used in formulating a wide variety of foods. The compounds responsible for objectionable flavors when raw ground peanuts are heated with water have been released when the drum-dried flakes are used in food formulation and are not reformed even though such foods are heat processed. This is shown in attached Table V.

The preheating prior to drum drying results in stabilization of the fat in the peanut flakes. Since the peanuts used averaged as much as 46 percent fat, it might reasonably have been expected that rancidity would develop quickly because of the large amount of exposed surface in the flakes.

This stability, however, was not achieved in flakes prepared from peanut material which was not given a preheat treatment as shown in appended Table III. It is not necessary to preheat to 240° F. to achieve this stability, however. Preheating of finely ground peanut-water mixtures for 10 minutes at 203° C. (95° C.) also gave a product which was dried into flakes of satisfactory stability. Preheating at 158° F. (70° C.) is unsatisfactory in stabilizing the fat against oxidation. Experiments indicate that preheating to at least 194° F. (90° C.) for ten minutes is necessary to achieve good stability on storage; but in consideration of other quality factors, it is preferred to ureheat to at least 203° F. (95° C.) or higher. The addition of an antioxidant and a synergist (butylated hydroxyanisole and citric acid) to a non-preheated peanut-water mixture did not result in producing the stabilizing effect achieved by preheating, Table III.

Any grinding procedure which produces a desired fineness of grind may be used. For example, after removal of the red skins and hearts, the dried peanuts may be in a 3 inch "Premier Colloid Mill" equipment with a Carborundum rotor and stator adjusted to allow 0.010 inch between the grinding surfaces. Before grinding, the peanuts should be reduced, for best results, to a moisture content of about 2 to 3 percent but should not be roasted or heated to the point that roasted peanut flavors develop. This can be accomplished, for example, by heating raw peanuts of commerce, having 5 to 10 percent moisture, for about 1 hour at 225° F. After grinding in the colloid mill, particles are of such size that they will all pass through a standard 20 mesh sieve. These particles may be said to be "oil free" to indicate a method of measuring the reduction in size which was accomplished in grinding the peanuts. For the purpose of this process, other grinding equipment may also be used. It is preferable that less than 5% of the oil-free solids be retained by a 200 mesh screen.

The following example defines the essential steps in carrying out the process.

(1) Mix finely ground uncooked, unroasted peanuts with one to five parts by weight of water to form a smooth suspension of solid particles and an emulsion of oil droplets in water. The amount of water to be used increases with the time and temperature of heating this suspension, as indicated in attached Table I. The quantity of water also depends on the type of peanuts used. With Spanish peanuts we prefer a proportion of 1 part finely ground peanuts to about 2.5 parts of water when the heating temperature is 203° F. for 10 minutes; but when the heating temperature is 240° F. for 20 minutes we prefer to use 1 part of finely ground peanuts to about 4 parts of water by weight. The mix must be processed by heating without delay to prevent enzymatic changes and growth of microorganisms. The amount of water determines the consistency of the heated, or cooked material, and it is necessary that the consistency be within certain limits for the drum drying step. The preferred consistency is such that a flow rate between 2 and 12 units in 10 seconds as measured on a Bostwick consistometer was satisfactory for our small drum dryer. It will be understood that the greater the Bostwick unit, the more fluid the material.

(2) Heat the suspension described above for a sufficient length of time at a temperature high enough to inactivate the enzyme lipoxidase. This is necessary in order to prevent the promotion of the development of rancidity by the catalytic oxidation of the lipids in the finished flakes. This is accomplished by a temperature of at least 203° F. for at least 10 minutes. (Temperatures greater than this and times longer than this may also be used.) Heating at temperatures up to 250° F. for as long as 40 minutes have been used, but for practical purposes it is not necessary to consider heating above 240° F. for 20 minutes. One desirable effect of using temperatures above the minimum required to inactivate lipoxidase is that flakes of smoother texture and less oily appearance are produced upon drum drying.

When temperatures of preheating are below 212° F. flowing steam has been used to heat the mix. When temperatures of heating are above 212° F. the mixture must be heated under pressure. It is preferable to use temperatures in the range 200–240° F.

(3) Drum dry the heated, or cooked, peanut material. The drums should be of a nature that iron, copper, or other heavy metal does not contaminate the product since this would catalyze oxidation of the lipids and result in a short shelf life. Chromium plated, as well as stainless steel or other suitably coated drums, can be used.

The space between the drums is adjusted so the material coats the drum surfaces evenly and is dried prior to being removed by the knife blades. The revolving speed and the steam pressure in the drums are adjusted so that the peanut flakes are dry (about 3 to 8% moisture) but not at all browned prior to being removed by the blades. Browning deterioration, an undesirable change occurring in some dehydrated foods, does not occur in peanut flakes as herein defined. Good results are achieved when the clearance between the drums was 0.016 inch, steam pressure was 75 to 85 pounds per square inch, and revolving speed about 1 revolution per 18 seconds.

The range of temperature in the preheating step is necessary to give suitable consistencies for top feeding of double drum dryer. An increase in consistency occurs due to gelatinization of starch granules and coagulation of proteins. The amount of increase in consistency is related to the temperature and time of preheating, the state of subdivision of the peanuts, and the relative quantities of finely ground peanuts and water. Table I shows that increasing quantities of water are required with increasing preheat temperatures to produce approximately the same consistency. This table also shows that little or no increase in consistency occurs when heating temperatures are 140° F. and 158° F. Table IV shows that the effect of preheating on consistency depends also on whether or not the peanuts are finely ground prior to or after preheating with water. When peanut halves were heated with water and then ground through the colloid mill and mixed with the water in which they were heated, the consistency was much more fluid than when the peanuts were finely ground prior to preheating with water.

Table II shows that the preheat treatment influences the appearance and texture qualities of the flakes. Samples 1, 2 and 3 which received preheat treatments from none to 176° F. for 10 minutes were generally brittle, with a coarse feel in the mouth when they were eaten. They were also somewhat oily and translucent because of apparent inability of the insufficiently heated proteins and carbohydrates to absorb all of the oil. As the preheating temperatures increased, samples 4, 5 and 6, the flakes became less oily, more opaque, and developed a smooth mouth feel. This effect is attributed to the gelatinization of starch granules and coagulation of proteins, with the resulting formation of a matrix within which the oil was fixed or absorbed. It is undesirable for the flakes to have an oily appearance and for most of the applications in which the flakes have been used in food product formulation, a smooth mouth feel is desired.

The rougher texture, or mouth feel, of flakes made from low heat treated, finely ground peanut-water suspension, or mixture, is probably due to the fact that the protein coagulates in large agglomerates as it dries on the drum surfaces, whereas when the finely ground peanut-water mixture is subjected to greater preheating, the protein and starch undergo changes as individual particles with the result that a different orientation is obtained during subsequent drum drying.

For use in simulated meat products of the bologna and weiner type, for cheese-like products, and for peanut-potato flakes it is preferable for the flakes to have a smooth texture as judged by mouth feel. There could be applications, however, where the coarser texture would be an advantage, such as in a breakfast food of the dry type in which certain cereal products, corn, wheat, oats, or rice, for example, are combined with the peanut-water suspension-emulsion prior to drum drying. It is believed that the precooked full-fat flakes have excellent applications in simulated meat items of the bologna and weiner type, either as an extender or when used as the major ingredient. Excellent results were also obtained when the flakes were used as an extender in the formulation of boneless chicken roll along with either ground or diced chicken meat. The simulated or extended meat items have been processed in suitable flexible casing materials. An additional application of the precooked full-fat peanut flakes is as an extender in chicken or tuna salad. The flakes have also been used as the major ingredient in formulation of an imitation chicken salad and sandwich filling.

For some food applications a low fat, high protein peanut flake may be desirable. Such flakes may be readily prepared from the precooked full-fat peanut flakes by solvent extraction. The essentially fat-free flakes thus obtained are about 60 percent protein, are devoid of almost all flavor, and are white in color. They may be readily ground into flour and, when used as a supplement with wheat flour in making bread, gave a product with a higher acceptance rating than was obtained by using defatted peanut flour which had not been precooked.

TABLE I

[Quantity of water required to be added to 250 grams finely ground peanuts to produce consistencies within limits indicated when preheating is at temperatures shown]

| Sample No. | Preheating temperature for 10 minutes | | Consistency of preheated peanut-water mixture | Cubic centimeters [1] |
|---|---|---|---|---|
| | ° F. | ° C. | Bostwick units/10 seconds | |
| 1 | 140 | 60 | >24.0 | 500 |
| 2 | 158 | 70 | >24.0 | 500 |
| 3 | 158 | 70 | 9.0 | 250 |
| 4 | 176 | 80 | 7.0 | 500 |
| 5 | 194 | 90 | 8.5 | 575 |
| 6 | 203 | 95 | 7.5 | 610 |
| 7 | 212 | 100 | 7.5 | 625 |
| 8 | 221 | 105 | 7.0 | 650 |
| 9 | 240 | 115 | 7.2 | 890 |

[1] Water needed to give consistency indicated.

TABLE II

[Effect of temperature of preheating finely ground peanut-water mixture on quality of full-fat peanut flakes]

| Sample No. | Preheating temperature | | Appearance of full-fat peanut flakes | Physical characteristics of full-fat peanut flakes |
|---|---|---|---|---|
| | ° F. | ° C. | | |
| 1 | None | None | Lacy, oily | Brittle, very coarse mouth feel. |
| 2 | 158 | 70 | Translucent, oily | Brittle, coarse mouth feel. |
| 3 | 176 | 80 | Somewhat translucent, oily. | Do. |
| 4 | 203 | 95 | Less translucent and oily than samples 1 and 2. | Smoother mouth feel than 1, 2, and 3. |
| 5 | 212 | 100 | Opaque, white, not oily. | Smooth mouth feel. |
| 6 | 240 | 115 | do | Very smooth mouth feel. |

TABLE III

Effect of preheat treatment of finely ground peanut-water mixture on rancidity and oxidation of full-fat peanut flakes during storage]

| | Storage at 100° F. | | | | | Storage at 145° F. | | Storage at 100° F. | |
|---|---|---|---|---|---|---|---|---|---|
| | Peroxide,[1] month. | | | TBA[2] month. | | TBA[2] week. | | Acceptability[3], month. | |
| Preheat or other treatment | 0 | 3 | 12 | 0 | 12 | 0 | 2 | 0 | 12 |
| None | 3.0 | 20 | 300 | 92 | 14 | | | 8.0 | [4]3.0 |
| Do | 3.0 | | 289 | 94 | 18 | 94 | 50 | 8.3 | [4]3.0 |
| 20 minutes at 240° F | 2.5 | | 82 | 90 | 87 | 93 | 85 | 8.0 | 6.6 |
| Do | 3.0 | | [5]40 | 94 | 90 | | | 8.2 | 7.0 |
| No preheating plus 0.01% BHA[6] plus 0.01% citric acid | 3.0 | | 149 | 20 | 87 | | | | [4]4.0 |

[1] Peroxide as milliequivalents of peroxide oxygen/1,000 grams of extracted oil.
[2] Thiobarbituric acid value as percent transmission at 530 millimicrons.
[3] Acceptability on 9-point scale ranging from 1 (dislike extremely) to 9 (like extremely).
[4] Rancid.
[5] Ten months storage.
[6] Butylated hydroxyanisole (antioxidant).

TABLE IV

[Effect of pregrinding peanuts on consistency of autoclaved peanut-water mixture]

| Sample preparation | Heat treatment, ° F. for 20 minutes | Consistency[1] of Bostwick units/10 seconds |
|---|---|---|
| 100 grams colloid-milled Spanish peanuts plus 400 ml. water | 240 | 4.5 |
| 100 grams blanched Spanish peanut halves plus 400 ml. water** | 240 | >24.0 |
| 100 grams blanched Planters' peanut halves plus 400 ml. water** | 240 | 16.0 |

[1] Heated peanut-water mixture.
**These samples were ground through the colloid mill after the heat treatment at 240° F.

TABLE V.—ACCEPTANCE RATINGS OF BISCUITS WITH PEANUT SUPPLEMENTS

Sample designation:    Mean acceptance rating[1]
Biscuits with precooked defatted peanut flour -- 6.7
Biscuits with uncooked defatted peanut flour -- 5.9
Biscuits with precooked full-fat peanut flakes -- 7.2
Biscuits with uncooked full-fat peanut paste --- 6.0

[1] On 9-point hedonic scale.

What is claimed is:

1. A process of converting peanuts into precooked flakes of bland taste, high in protein and calories, comprising the steps of:
   (a) removing the skins and hearts from uncooked, unroasted, peanuts;
   (b) reducing the moisture contents of the peanuts to about 1–6% by weight;
   (c) grinding the peanuts to a fine consistency with the parts being sufficiently small to permit substantially all particles to pass through a standard 140-mesh screen of U.S. Sieve series;
   (d) adding water to the ground peanuts to form an emulsion of oil droplets and a suspension of solids;
   (e) preheating the emulsion-suspension to a temperature between 200 and 240° F. for a time sufficient to inactivate the enzyme lipoxidase; and
   (f) drum drying the peanut material to coat the drum surfaces evenly and then removing the coating by scraping them off with knives, thus forming the desired flakes.

2. The process as defined in claim 1, wherein the moisture content of the peanuts (step b) is reduced to 2–4% by weight.

3. The process defined in claim 1, wherein the consistency of the preheated peanut-water emulsion-suspension is such as to produce a flow rate of between 2 and 12 units in 10 seconds as measured on a Bostwick consistometer.

4. The process defined in claim 1, wherein the drying of the emulsion-suspension is performed on heated drums wherein the space between the drums is about 0.016 inch, the drums being heated by steam pressure of between 75 and 85 pounds per square inch.

5. The process defined in claim 1, wherein the preheating of the peanut-water emulsion-suspension is continued from about 2 minutes up to about 60 minutes at a temperature from about 200° up to about 240° F.

6. The process as defined in claim 5, wherein the preheating of the peanut-water emulsion-suspension is continued for at least 2 minutes at a temperature of about 203° C.

References Cited

UNITED STATES PATENTS

| 1,813,268 | 7/1931 | Bachler | 99—98 |
| 2,106,372 | 1/1938 | Ezaki | 99—126 X |
| 2,217,701 | 10/1940 | Musher | 99—128 |
| 2,511,119 | 6/1950 | Mitchell | 99—128 |
| 2,685,519 | 8/1954 | Moore | 99—126 X |
| 3,317,325 | 5/1967 | Durst | 99—126 |
| 3,346,390 | 10/1967 | Pichel | 99—128 X |
| 3,543,823 | 12/1970 | Keen | 99—98 X |

FOREIGN PATENTS

| 682,230 | 3/1964 | Canada. |
| 222,975 | 10/1924 | England. |

OTHER REFERENCES

Perry's, Chemical Engineers' Handbook 3rd edition, McGraw-Hill, 1950, pp. 863–866.

FRANK W. LUTTER, Primary Examiner

S. L. WEINSTEIN, Assistant Examiner

U.S. Cl. X.R.

99—98